(12) United States Patent
Schwalbe et al.

(10) Patent No.: US 10,689,029 B2
(45) Date of Patent: Jun. 23, 2020

(54) FOUR-WHEEL STEERING WITH FRONT/REAR MATCHING GEOMETRIES

(71) Applicant: CNH Industrial America LLC, New Holland, PA (US)

(72) Inventors: Blaine A. Schwalbe, Valders, WI (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 254 days.

(21) Appl. No.: 15/951,490

(22) Filed: Apr. 12, 2018

(65) Prior Publication Data
US 2019/0315395 A1    Oct. 17, 2019

(51) Int. Cl.
| | |
|---|---|
| *B62D 6/00* | (2006.01) |
| *B62D 5/12* | (2006.01) |
| *B62D 7/14* | (2006.01) |
| *A01M 7/00* | (2006.01) |
| *A01G 25/09* | (2006.01) |
| *A01C 23/04* | (2006.01) |

(52) U.S. Cl.
CPC ............ *B62D 6/002* (2013.01); *B62D 5/12* (2013.01); *B62D 7/142* (2013.01); *A01C 23/047* (2013.01); *A01G 25/09* (2013.01); *A01M 7/0042* (2013.01)

(58) Field of Classification Search
CPC .................................................. B62D 6/002
See application file for complete search history.

(56) References Cited

U.S. PATENT DOCUMENTS

| | | | | |
|---|---|---|---|---|
| 3,800,899 A | * | 4/1974 | Thwaites | B60G 9/02 180/237 |
| 3,827,518 A | * | 8/1974 | Kuhl | B62D 53/021 180/12 |

(Continued)

FOREIGN PATENT DOCUMENTS

| | | |
|---|---|---|
| CN | 202186422 | 4/2012 |
| JP | 1109172 | 4/1989 |

(Continued)

OTHER PUBLICATIONS

Bruin—Bruin HS700 Sprayer—Bruin—2017; retrieved on Nov. 21, 2017 from https://bruinsprayers.com/bruin-hs700-sprayer/.

*Primary Examiner* — Alex C Dunn
(74) *Attorney, Agent, or Firm* — Rebecca L. Henkel; Rickard J. DeMille

(57) ABSTRACT

A high clearance sprayer with a four-wheel steering system includes a steering input, a steering control system, a front steering system, and a rear steering system. The front and rear steering systems are mirrored images of one another, which simplifies and improves the accuracy of the four-wheel steering control methodology. In doing so, the control system may calculate a single value that is used for controlling the front steering system, and an inverse of the single value that is used for controlling the rear steering system. Both of the front steering system and the rear steering system include wheels, steering actuator systems, swingarms, and wheel supports, which all of position of the wheels relative to the sprayer to be rotated. The steering control system may allow for various steering maneuvers to occur, including a turn-steering maneuver and a crab-steering maneuver.

20 Claims, 10 Drawing Sheets

(56) References Cited

U.S. PATENT DOCUMENTS

| | | | | |
|---|---|---|---|---|
| 3,878,911 | A * | 4/1975 | Nichols | A01M 7/0082 |
| | | | | 180/235 |
| 3,942,218 | A * | 3/1976 | Krier | A47L 11/30 |
| | | | | 15/340.3 |
| 5,020,627 | A | 6/1991 | Donaghue | |
| 5,039,129 | A * | 8/1991 | Balmer | B60G 3/04 |
| | | | | 180/209 |
| 5,174,595 | A * | 12/1992 | Snipes | B62D 7/142 |
| | | | | 180/411 |
| 5,482,125 | A | 1/1996 | Pagett | |
| 5,597,172 | A * | 1/1997 | Maiwald | B60G 3/00 |
| | | | | 280/124.153 |
| 6,164,406 | A * | 12/2000 | Diekhans | B62D 7/1509 |
| | | | | 180/327 |
| 6,454,294 | B1 * | 9/2002 | Bittner | B60G 99/00 |
| | | | | 280/677 |
| 6,460,643 | B1 * | 10/2002 | Degelman | B62D 49/0607 |
| | | | | 180/235 |
| 6,571,160 | B2 | 5/2003 | Akita | |
| 6,684,974 | B1 * | 2/2004 | Ulschmid | B62D 7/142 |
| | | | | 180/414 |
| 6,761,234 | B1 | 7/2004 | Lamela et al. | |
| 6,890,092 | B2 * | 5/2005 | Tamminga | A01K 5/004 |
| | | | | 241/101.761 |
| 7,510,199 | B2 * | 3/2009 | Nash | B60G 7/02 |
| | | | | 180/311 |
| 7,845,287 | B2 * | 12/2010 | Smith | B61F 5/44 |
| | | | | 105/168 |
| 7,922,184 | B2 * | 4/2011 | Porcheron | A61G 5/046 |
| | | | | 280/93.506 |
| 8,302,728 | B1 | 11/2012 | Dotson | |
| 8,600,620 | B2 * | 12/2013 | Noel | B62D 3/02 |
| | | | | 180/400 |
| 9,221,311 | B2 * | 12/2015 | Axelsson | B60D 1/14 |
| 9,296,418 | B2 | 3/2016 | Inoue | |
| 9,376,141 | B1 * | 6/2016 | Shi | B62D 7/1509 |
| 9,540,039 | B2 | 1/2017 | Kunihiro et al. | |
| 9,591,811 | B2 * | 3/2017 | Prohaska | A01G 3/088 |
| 9,789,869 | B2 | 10/2017 | Fujita | |
| 10,086,868 | B1 * | 10/2018 | Brooks | B62D 5/20 |
| 10,278,330 | B2 * | 5/2019 | Silver | A01D 41/06 |
| 10,464,600 | B2 * | 11/2019 | Treinen | B62D 5/06 |
| 2003/0070865 | A1 * | 4/2003 | Engelbrecht | B62D 5/09 |
| | | | | 180/432 |
| 2014/0367190 | A1 | 12/2014 | Porcheron | |
| 2016/0147225 | A1 * | 5/2016 | Sights | G05D 1/0088 |
| | | | | 701/23 |
| 2016/0318465 | A1 * | 11/2016 | Brooks | B60K 35/00 |
| 2016/0318550 | A1 * | 11/2016 | Brooks | A01C 23/00 |
| 2017/0010619 | A1 * | 1/2017 | Foster | G05D 1/0223 |
| 2018/0257454 | A1 * | 9/2018 | Brooks | B60H 1/00807 |
| 2018/0327021 | A1 * | 11/2018 | Brooks | B62D 7/148 |
| 2019/0022687 | A1 * | 1/2019 | Brooks | A01M 7/0042 |
| 2019/0071115 | A1 * | 3/2019 | Brooks | B62D 7/142 |
| 2019/0135171 | A1 * | 5/2019 | Brooks | B60Q 3/80 |

FOREIGN PATENT DOCUMENTS

| | | |
|---|---|---|
| JP | 6206574 | 7/1994 |
| JP | 202147717 | 2/2012 |

* cited by examiner

FOUR-WHEEL STEERING WITH FRONT/REAR MATCHING GEOMETRIES

FIELD OF THE INVENTION

The invention relates generally to agricultural product application equipment such as self-propelled sprayers and, in particular, to an agricultural product application equipment having four-wheel steering, where front steering components are mirror images of rear steering components to simplify and improve the accuracy of control of these components.

BACKGROUND OF THE INVENTION

High-clearance sprayers are getting larger and more complex. Some sprayers have four-wheel steering, which improves maneuverability of the sprayer during use, such as when making tight turns in a field's headlands. These four-wheel steering systems typically have a controller that electronically controls a single-steering valve that meters hydraulic fluid to both hydraulic rear-steering cylinders to correspond to a front-steering input. Calculations needed to determine rear-steering control can be complex because front-steering components and rear-steering components typically have different geometries and configurations. As a result, the calculations must be adjusted to account for these differences. The complexities of these controls can lead to rear-steering delays or inaccuracies that may provide rear-steer wandering or out-of-track alignment of the front and rear wheels during steering maneuvers.

As such, there is need for four-wheel steering components that can more easily and accurately be controlled.

SUMMARY OF THE INVENTION

The present invention is directed to a high clearance sprayer for simplified steering having a steering input device, a front steering system, a rear steering system, and a rear steering control system. The steering input device may be configured to be manipulated by a user steering the high clearance sprayer to perform a steering maneuver. The front steering system may include a pair of steerable front wheels and a front steering actuator system. The pair of steerable front wheels may include a first wheel configured to pivot about a first generally vertical steering axis and a second wheel configured to pivot about a second generally vertical steering axis. The front steering actuator system may be configured to pivot the pair of steerable front wheels in a common direction during the steering maneuver to define a front steering direction and a front steering angle during the steering maneuver. The rear steering system may include a pair of steerable rear wheels and a rear steering actuator system. The pair of steerable rear wheels may include a third wheel configured to pivot about a third generally vertical steering axis and a fourth wheel configured to pivot about a fourth generally vertical steering axis. The rear steering actuator system may be configured to pivot the pair of steerable rear wheels in a common direction during the steering maneuver to define a rear steering direction and a rear steering angle during the steering maneuver. The steering control system is configured to command the rear steering system to steer the pair of steerable rear wheels so that the rear steering angle has a common magnitude with the front steering angle.

According to another aspect of the invention, the front steering component may have a first steering component configured to control steering movements of the first wheel and a second steering component configured to control steering movements of the second wheel. Similarly, the rear steering system may have a third steering component configured to control steering movements of the third wheel and a fourth steering component configured to control steering movements of the fourth wheel. Additionally, the steering control system may evaluate the amount of steering of the front steering system and then control the rear steering system so that each of the third and fourth steering components is moved in the same amount but in opposite directions as a corresponding diagonally arranged one of the first and second steering components of the front steering system. Further, for each of the first and second steering components of the front steering system, the controller system evaluates a corresponding front steering value and determines a rear steering value for a corresponding diagonally arranged one of the third and fourth steering components of the rear steering system by determining an additive inverse of the front steering value. The corresponding pairs of steering components of the front and rear steering systems may be steered to steering values that are equal in magnitude and opposite in direction.

In accordance with an aspect of the present invention, the high clearance sprayer additionally includes a chassis, a pair of front swingarms, a pair of front wheel support legs, a pair of rear swingarms, and a pair of rear wheel support legs. The chassis may have a frame with front and rear portions. For instance, the pair of front swingarms may be arranged at the front portion of the chassis frame, and the pair of rear swingarms may be arranged at the rear portion of the frame. Additionally, the pair of front wheel support legs may support the pair of steerable front wheels and is pivotally connected to the pair of front swingarms to define the first and second generally vertical steering axes. Similarly, the pair of rear wheel support legs may support the pair of steerable rear wheels and is pivotally connected to the pair of rear swingarms to define the third and fourth generally vertical steering axes. Further still, the front steering actuator system may define a first steering actuator that extends between a first swingarm of the pair of front swingarms and a first wheel support of the pair of front wheel supports to move the first wheel support and the first steerable wheel to the front steering direction and the front steering angle. Likewise, the front steering actuator system may define a second steering actuator that extends between a second swingarm of the pair of front swingarms and a second wheel support of the pair of front wheel supports to move the second wheel support and the second steerable wheel to the front steering direction and the front steering angle. Also, the rear steering actuator system may define a third steering actuator that extends between a third swingarm of the pair of rear swingarms and a third wheel support of the pair of rear wheel supports to move the third wheel support and the third steerable wheel to the rear steering direction and the rear steering angle. Further still, the rear steering actuator system may define a fourth steering actuator that extends between a fourth swingarm of the pair of rear swingarms and a fourth wheel support of the pair of rear wheel supports to move the fourth wheel support and the fourth steerable wheel to the rear steering direction and the rear steering angle.

According to yet another aspect of the invention, the high clearance sprayer includes a first swingarm, a second swingarm, a third swingarm, and a fourth swingarm. The first swingarm may define a first suspension component supported by the frame, the second swingarm may define a second suspension component supported by the frame, the third swingarm may define a third suspension component supported by the frame, and the fourth swingarm may define a fourth suspension component supported by the frame. Furthermore, each respective swingarm may have a related actuating cylinder, where each actuating cylinder has an inner end connected to the respective swingarm and an outer end connected to a respective steering component for moving the steering component to steer the wheel associated with the swingarm. The first and second actuating cylinders may be arranged angularly with respect to each other, with the outer ends of these cylinders arranged closer to a center line of the high clearance sprayer than the inner ends of the first and second actuating cylinders. Likewise, the third and fourth actuating cylinders are arranged angularly with respect to one another, where the outer ends of these cylinders are arranged to be closer to the center line of the sprayer than the inners ends of these cylinders.

In accordance with another aspect of the present invention, the steering maneuver may define a turn-steering maneuver. During the turn-steering maneuver, the steering control system may receive a steering input from the user through the steering input device that defines a turn-steering command for providing a turning-type heading of the high clearance sprayer. The steering control system may also control the first and second steering actuators to provide the front steering direction and the front steering angle to correspond to the turn-steering command. The steering control system may also control the third and fourth steering actuators to provide a rear steering direction that is opposite the front steering direction and the rear steering angle with the common magnitude as the front steering angle so that the pair of front steerable wheels and the pair of rear steerable wheels are pivoted the same amount but in different direction during the turn-steering maneuver.

In accordance with another aspect of the present invention, the steering maneuver may define a crab-steering maneuver. During the crab-steering maneuver, the steering control system may receive a steering input from the user through the steering input device that defines a crab-steering command for providing an oblique-type heading of the high clearance sprayer. The steering control system may also control the first and second steering actuators to provide the front steering direction and the front steering angle to correspond to the crab-steering command. The steering control system may also control the third and fourth steering actuators to provide a rear steering direction that is the same as the front steering direction and the rear steering angle with the common magnitude as the front steering angle so that the pair of front steerable wheels and the pair of rear steerable wheels are pivoted the same amount and in the same direction during the crab-steering maneuver.

According to another aspect of the invention, the high clearance sprayer may also include a steering joint that may be defined at each intersection of the swingarms and the corresponding wheel support legs. For instance, the front of the steering system may include a pair of front steering joints that define first and second steering joints coupled to first and second steering actuators that are configured to move the first and second steering joints relative to the chassis frame to pivot the first and second wheel about the first and second steering axes. Similarly, the rear of the steering system may include a pair of rear steering joints that define third and fourth steering joints coupled to third and fourth steering actuators that are configured to move the third and fourth steering joints relative to the chassis frame to pivot the third and fourth wheel about the third and fourth steering axes. Additionally, the pair of front steering joints may be minor images of each other, and the pair of rear steering joints may be mirror images of each other, about a line of reflection that extends longitudinally through the high clearance sprayer. Further still, the pair of front steering joints may be mirror images of the pair of rear steering joints about a line of reflection that extends transversely through the high clearance sprayer. The first steering joint and the third steering joint may be longitudinally aligned with each other, while the second steering joint and the fourth steering joint may be longitudinally aligned with each other.

According to another aspect of the present invention, the steering control system may command a four wheel steering maneuver by controlling diagonal pairs of front and rear steering actuators at the respective pairs of steering joints. When this occurs, the steering control system commands the first and fourth steering actuators to move the first and fourth steering joints to positions that define corresponding steering angles of a common magnitude and opposite direction. Simultaneously, the steering control system commands the second and the third steering actuators to move the second and third steering joints to positions that define corresponding steering angles of a common magnitude and opposite directions. For instance, the steering control system may determine a command value for the diagonal pairs of the front and rear steering actuators by evaluating a command value for the respective front steering actuator as a front steering command value, and determine an additive inverse of the front steering command value as a rear steering command value for a corresponding diagonally arranged rear steering actuator. For instance, the steering control system may evaluate the front steering command value for the first steering actuator as a first front steering command value, and then determine an additive inverse of the first front steering command value to define a rear steering command value for the fourth rear steering actuator. Similarly, the steering control system may evaluate the front steering command value for the second steering actuator as a second front steering command value, and then determine an additive inverse of the second front steering command value to define a rear steering command value for the third rear steering actuator. Each of these steering command values may correspond to a distance moved by the respective steering actuator from a neutral position.

According to another aspect of the invention, each of the steering joints may include a steering knuckle, a steering kingpin, and an actuator lobe. The steering knuckle may be arranged at an upper end of the respective wheel support leg. The steering kingpin may define a respective steering axis that extends through the steering knuckle and an end of the respective swingarm. The actuator lobe may be connected to an end of the respective steering actuator, and may be arranged with respect to the steering knuckle so that actuation of the steering actuator pivots the steering knuckle and the wheel support leg about the steering kingpin.

According to another aspect of the present invention, each steering actuator has a first end connected to the respective swingarm and a second end connected to the respective wheel support leg. As a result, actuation of the respective actuators pivots the respective wheel support leg with respect to the respective swingarm.

According to another aspect of the present invention, a longitudinal axis is located along a centerline between left and right sides of the sprayer, where the first and second steering components are mirror images of each other as reflected about the longitudinal line, and where the third and fourth steering components are mirror images of each other as reflected about the longitudinal line. Additionally, a transverse axis is located midway between the steering components of the front steering system and the steering components of the rear steering system. The first and third steering components may be mirror images of each other as reflected about the transverse midline. Similarly, the second and fourth steering components are mirror images of each other as reflected about the transverse axis.

In accordance with yet another aspect of the present invention, a method of controlling the steering of a high clearance sprayer is disclosed, where the method provides steering movements to a first front wheel and a second front wheel and a rear steering system that provides steering movements to a first rear wheel and a second rear wheel. The method includes inputting a steering command from a user through a steering input device that corresponds to a front steering action of the front steering system. Next, a front steering value is evaluated that corresponds to the steering action of the front steering system. Thereafter, a rear steering value that has the same magnitude but opposite sign of the front steering value is determined. Next, the rear steering system is controlled to provide a rear steering action based on the rear steering value. Additionally, the method may include the step of controlling the steering of each of the rear wheels based on the steering action of the diagonally arranged opposite corner front wheel. A first rear steering value for steering the first rear wheel is calculated by determining an additive inverse of a steering value for steering the second front wheel. Next, a second rear steering value for steering the second rear wheel is determined by calculating an additive inverse of a steering value for steering the first front wheel. Further still, the method may include the steps of actuating first and second steering actuators, each of which extend between respective swingarms to respective wheel supports based on the front steering value to move the respective wheel support and the respective steerable wheel to a front steering direction at a front steering angle. Also, third and fourth steering actuators may be actuated, each of which extend between respective swingarms to respective wheel supports based on the rear steering value to move the respective wheel support and the respective steerable wheel to a rear steering direction at a rear steering angle.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
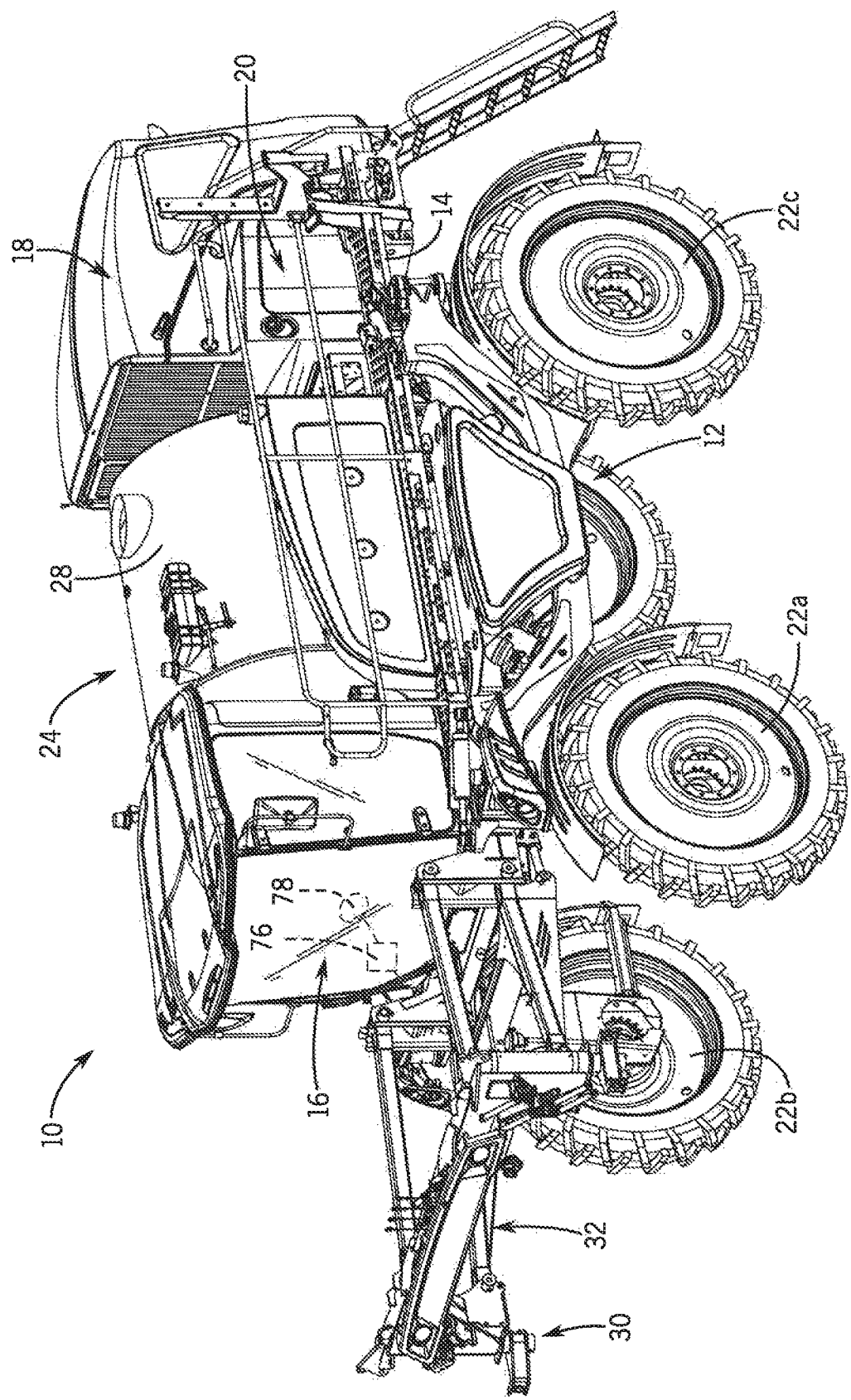
FIG. 1 is an isometric view of an agricultural machine.
Figure 2:
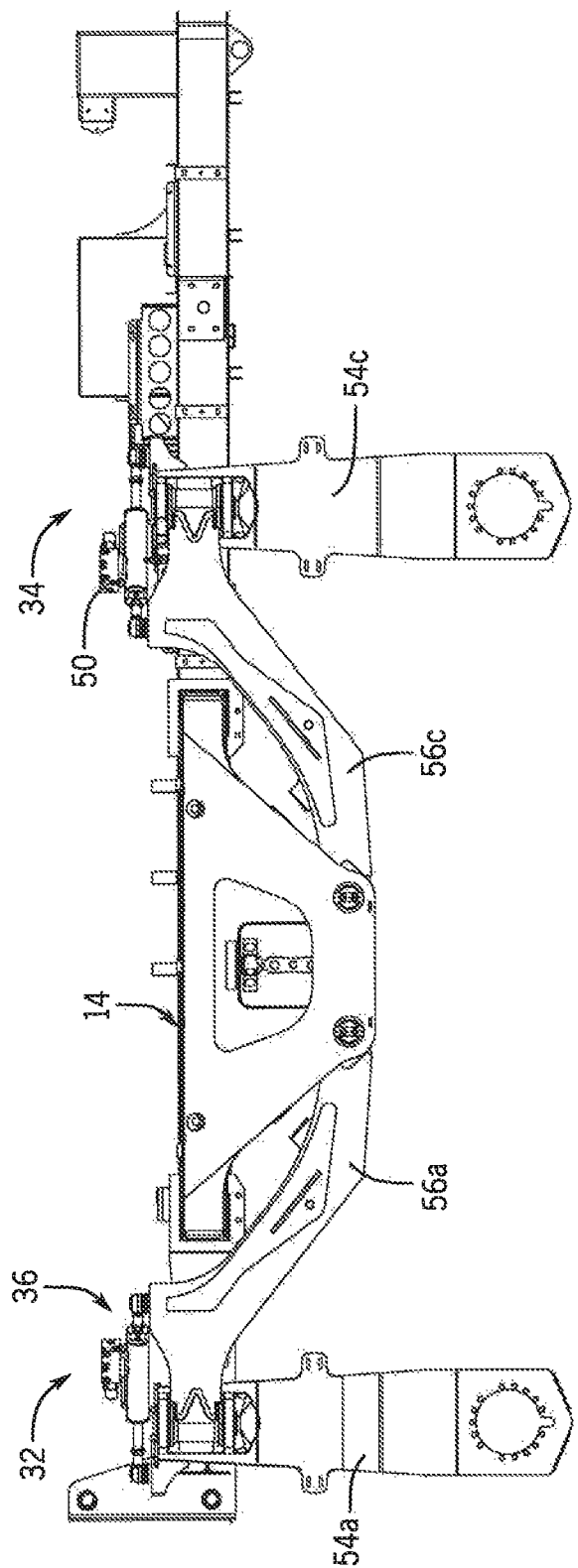
FIG. 2 is a side elevation view of a chassis frame of the agricultural machine of FIG. 1.
Figure 3:
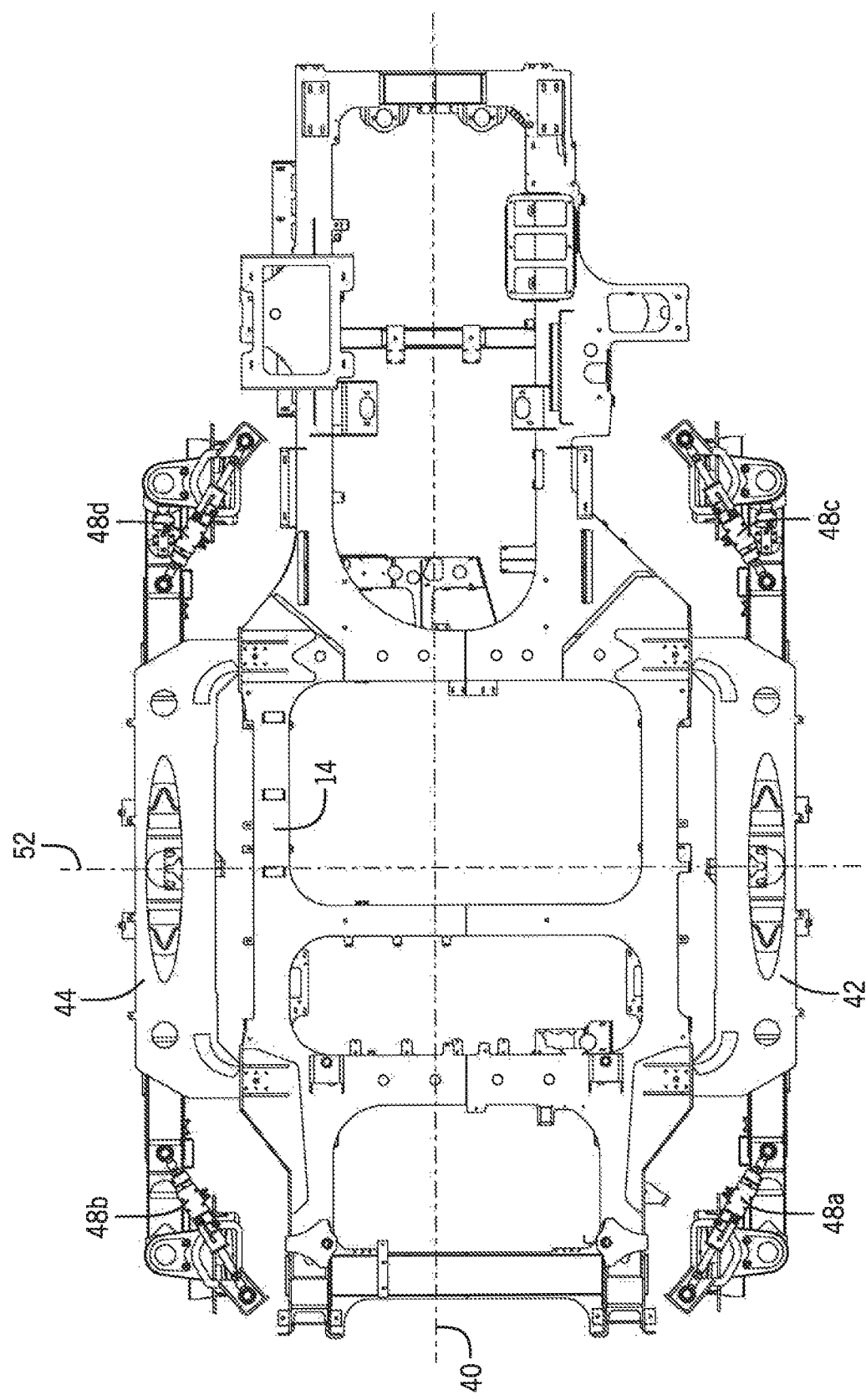
FIG. 3 is a top plan view of the chassis frame of the agricultural machine of FIG. 2.
Figure 4:
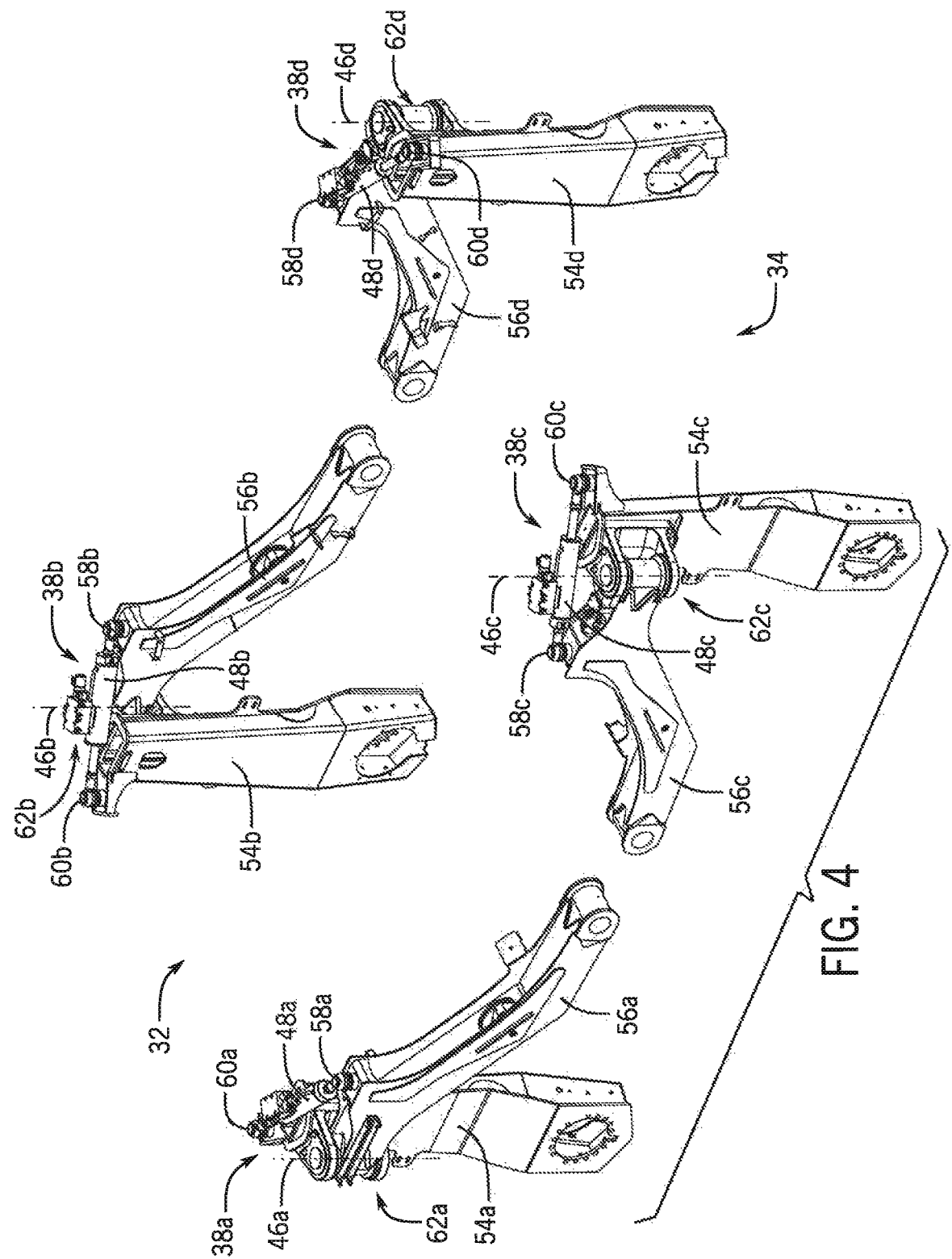
FIG. 4 is an isometric view of the four steering components of the agricultural machine of FIGS. 1-3.
Figure 5:
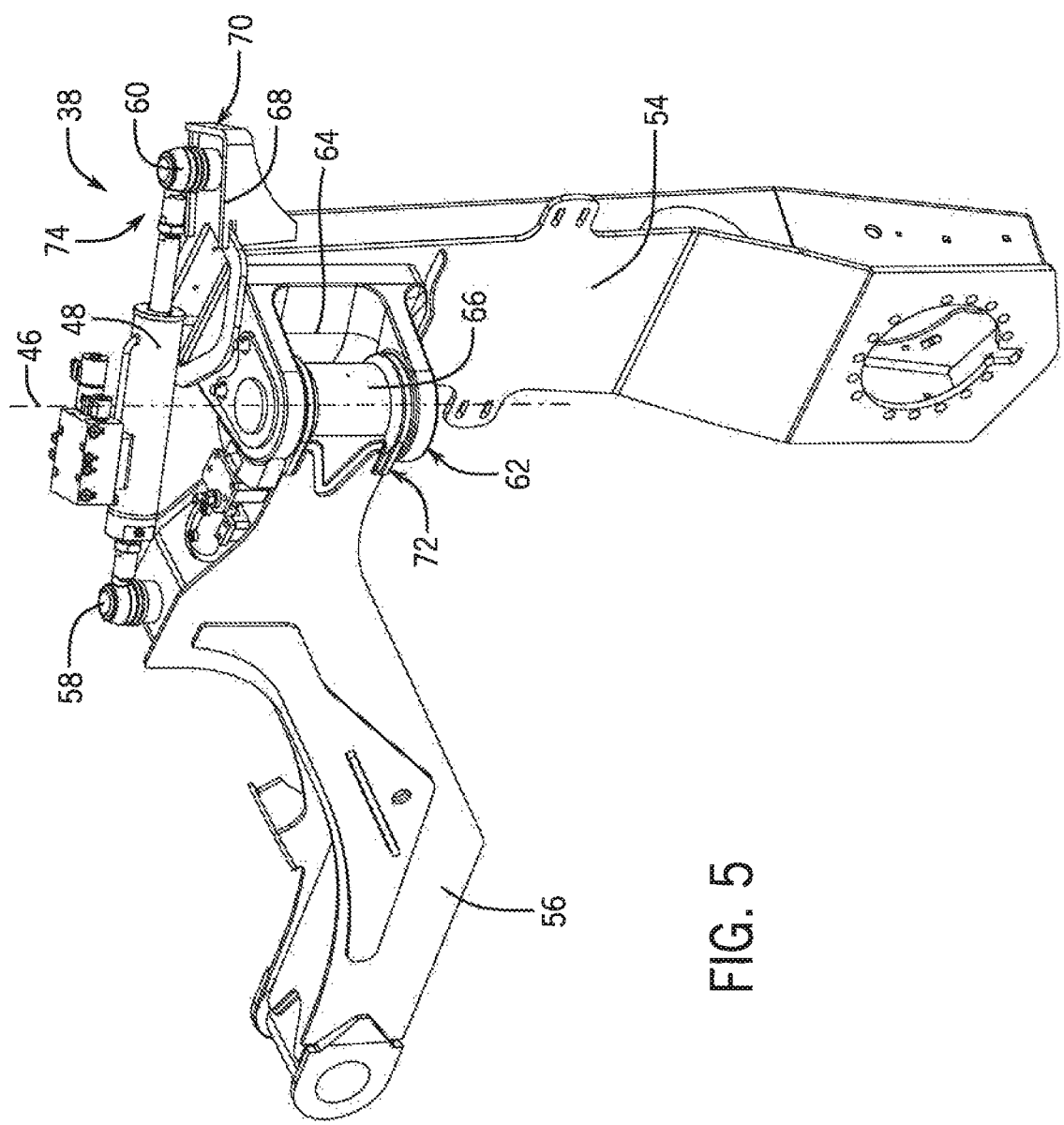
FIG. 5 is a detailed isometric view of one of the steering components of the agricultural machine of FIGS. 1-4.
Figure 6:
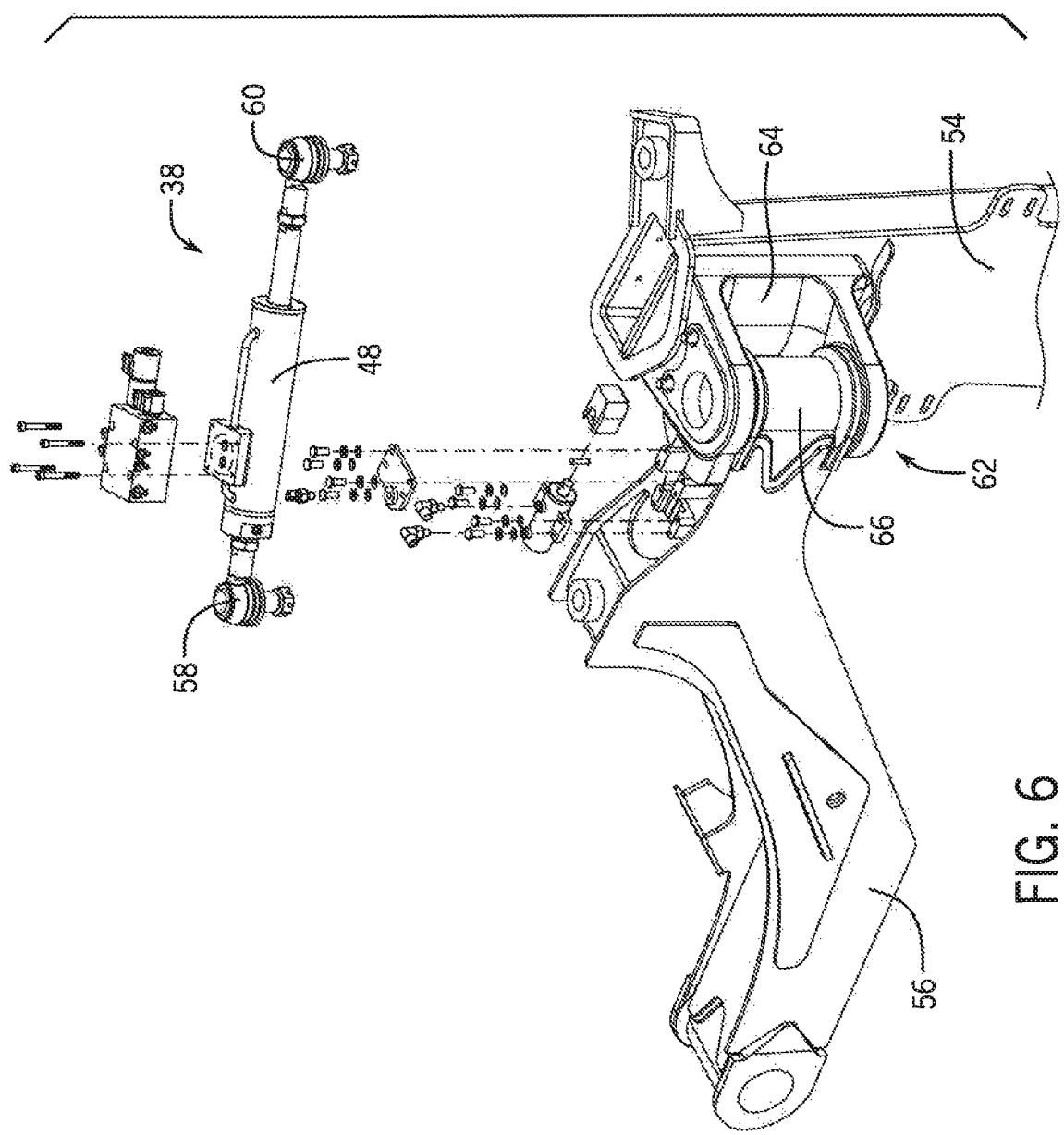
FIG. 6 is an exploded isometric view of the steering component from FIG. 5.
Figure 7:
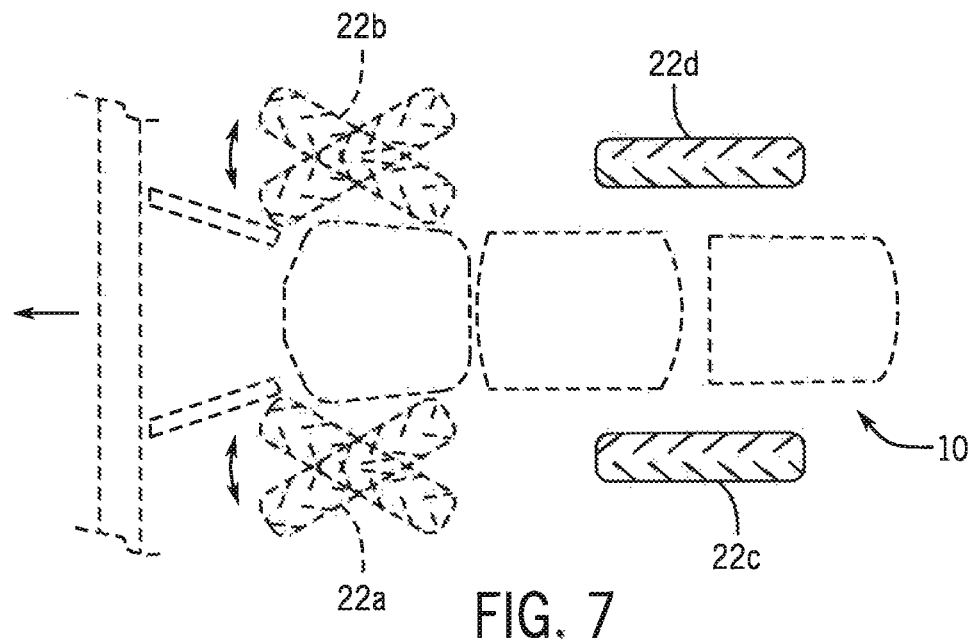
FIG. 7 is a schematic top plan view of the sprayer where front wheels are shown pivotable relative to the sprayer.
Figure 8:
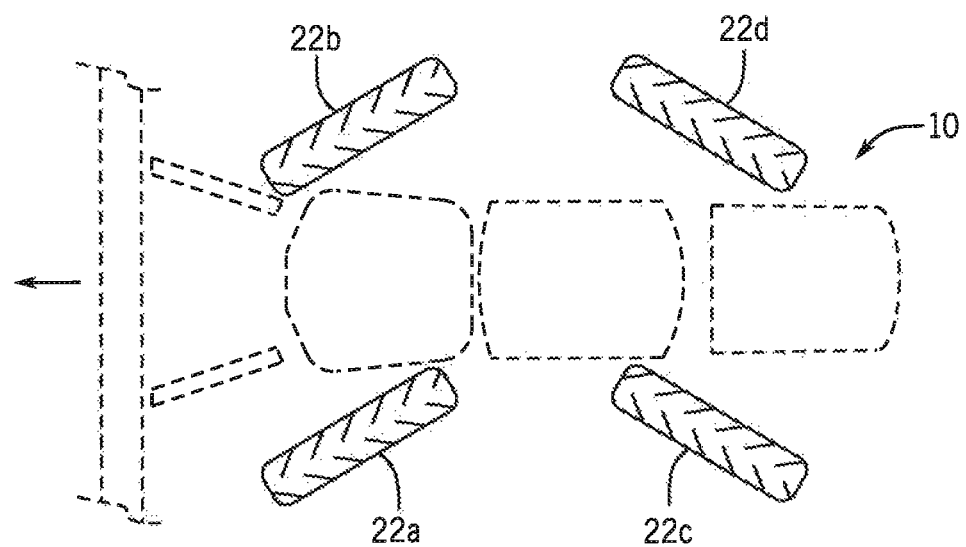
FIG. 8 is a schematic top plan view of the sprayer performing a first turn-steering maneuver.
Figure 9:
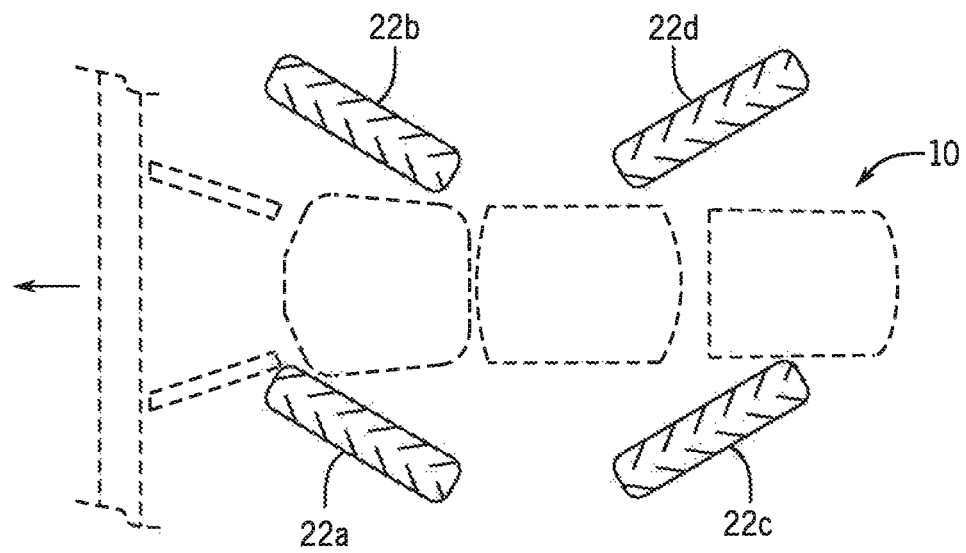
FIG. 9 is a schematic top plan view of the sprayer performing a second turn-steering maneuver.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. While the wheels will be described collected using reference number 22, each separate wheel may be shown or described separately with 22*a* being the first wheel, 22*b* being the second wheel, 22*c* being the third wheel, and 22*d* being the fourth wheel. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

The sprayer 10 has a configuration where a front steering system 32 and a rear steering system 34 are mirror images of one another for simplified calculation of control methodology. The front steering system 32 will now be described. The front steering system 32 includes the first wheel 22*a*, the second wheel 22*b*, a front steering actuator system 36, and first and second steering components 38*a*, 38*b* associated with the first wheel 22*a* and the second wheel 22*b* to control movement steering of the wheels 22*a*, 22*b*. The first and second steering components 38*a*, 38*b* are mirror images of each other as reflected about a longitudinal axis 40 located along a centerline between left side 42 and a right side 44 of the sprayer 10. The first wheel 22*a* is pivotable about a first generally vertical steering axis 46*a*, and the second wheel 22*b* is pivotable about a second generally vertical steering axis 46*b*. The front steering actuator system 36 may include a first steering actuator 48*a* and a second steering actuator 48*b*. For instance, as shown, the actuators are actuating cylinders.

The rear steering system 34 will now be described. The rear steering system 34 includes the third wheel 22*c*, the fourth wheel 22*d*, a rear steering actuator system 50, and a third and fourth steering components 38*c*, 38*d* associated with the third wheel 22*c* and the fourth wheel 22*d* to control steering movement of the wheels 22*c*, 22*d*. The third and fourth steering components 38*c*, 38*d* are also mirror images of each other as reflected about the longitudinal axis 40. Similarly, the first and third steering components 38*a*, 38*c* and the second and the fourth steering components 38*b*, 38*d* may be mirror images of each other as reflected about a transverse axis 52. The third wheel 22*c* is pivotable about a third generally vertical steering axis 46*c*, and the fourth wheel 22*d* is pivotable about a fourth generally vertical steering axis 46*d*. The rear steering actuator system 50 may include a third steering actuator 48*c* and a fourth steering actuator 48*d*. Like the wheels, the steering components, steering axes, and actuators may be referred to in general using reference numbers 38, 46, and 48, or a specific steering component, steering axis, and actuator may be referred to with the reference number in combination with letters a, b, c, or d.

In operation, the front steering actuator system 36 is configured to pivot the front wheels 22*a*, 22*b* about the first generally vertical steering axis 46*a* and the second generally vertical steering axis 46*b* in a common direction during a steering maneuver to define a front steering direction and a front steering angle. Also, the rear steering actuator system 50 is configured to pivot the rear wheels 22*c*, 22*d* about the third generally vertical steering axis 46*c* and the fourth generally vertical steering axis 46*d* in a common direction during the steering maneuver to define a rear steering direction and a rear steering angle. For instance, the front steering actuator system 36 allows front wheel support legs 54*a*, 54*b*, which will further be described below and the front wheels 22*a*, 22*b* to move to a front steering direction and a front steering angle, and the rear steering actuator system 50 allows rear wheel supports legs 54*c*, 54*d* and the rear wheels 22*c*, 22*d* to move to a rear steering direction and a rear steering angle. FIGS. 8-11 show the sprayer 10 in a variety of different steering directions as will further be described below.

Each actuator 48 extends between a respective swingarm 56 and a respective wheel support leg 54. More specifically, each actuator 48 has a first inner end 58 connected to a respective swingarm 56 and a second outer end 60 connected to the respective wheel support leg 54. As shown, the actuators 48 are arranged angularly with respect to each other, with each actuator 48 being arranged with the outer end 60 closer to a center line of the sprayer 10 than the inner end 58. The actuator 48 serves as a suspension component that is supported by the frame 14. Due to the actuator's association with the swingarm 56 and wheel support leg 54, when each actuator 48 is actuated, the wheel support leg 54 is pivoted with respect to the respective swingarm 56. As a result, the wheel support leg 54 rotates relative to the vertical steering axis 46 extending through the wheel support leg 54, which in turn results in the rotation of the wheel 22 about the axis 46. Again, the swingarms will be described collectively using reference number 56, each separate swingarm may be shown or described separately with 56*a* being the first swingarm, 56*b* being the second swingarm, 56*c* being the third swingarm, and 56*d* being the fourth swingarm. Also, the wheel support legs will be described collectively using reference number 54 although each separate wheel support leg may be shown and described separately with 54*a* being the first wheel support leg, 54*b* being the second wheel support leg, 54*c* being the third wheel support leg, and 54*d* being the fourth wheel support leg.

Additionally, a steering joint 62 may be defined at each intersection of the swingarm 56 and the corresponding wheel support leg 54. For instance, a pair of front steering joints with a first steering joint 62*a* and a second steering joint 62*b* may be located at the front of the chassis 12 and a pair of rear steering joints with a third steering joint 62*c* and a fourth steering joint 62*d* may be located at the rear of the chassis 12. The front steering joints 62*a*, 62*b* may be mirror images of each other about the longitudinal axis 40, and the rear steering joints 62*c*, 62*d* may similarly be mirror images of each other about the longitudinal axis 40. Further still, the pair of front steering joints 62*a*, 62*b* and the pair of rear steering joints 62*c*, 62*d* may be mirror images of one another about a transverse axis 52. Furthermore, the first steering joint 62*a* and the third steering joint 62*c* may be longitudinally aligned with each other, and the second steering joint 62*b* and the fourth steering joint 62*d* may also be longitudinally aligned with each other.

Each steering joint 62 may include a steering knuckle 64, a steering kingpin 66, and an actuator lobe 68. The steering knuckle 64 is arranged at an upper end 70 of the wheel support leg 54. The steering kingpin 66 defines the steering axis 46 and extends through the steering knuckle 64 and an end 72 of the respective swingarm 56. The actuator lobe 68 is connected to an end 74 of the respective steering actuator 48. Also, the actuator lobe 68 may be arranged with respect to the steering knuckle 64, such that the actuation of the actuator 48 pivots the steering knuckle 64 and the wheel support leg 54 about the steering kingpin 66. Again, while a singular steering joint has been described, it should be understood that four steering joints exist in relation to the four wheels and associated components.

The sprayer 10 also includes a steering input device 78 that can be manipulated by a user steering the sprayer 10 to result in a steering maneuver. For instance, as shown, the steering input device 78 could be a steering wheel, although other steering inputs such as levers, pedals, and the like could similarly be used. Additionally, the sprayer 10 may include the steering control system 76, as shown, a computer in operable connection with the steering input device 78. The computer of steering control system 76 may be implemented as an industrial computer or, e.g., a programmable logic controller (PLC), along with corresponding software and suitable memory for storing such software and hardware including interconnecting conductors for power and signal transmission for controlling respective electronic, electro-mechanical, hydraulic, and pneumatic components of the front and rear steering systems 32, 34. This includes position and other sensors for evaluating steering and other component position(s) and the actuators for moving the steering components to achieve a steering action. For example, the steering control system 76 may include or be used in connection with the first, second, third, and fourth steering components 38. The steering control system 76 may be configured to command the rear steering system 34 to steer the pair of steerable rear wheels 22*c*, 22*d* so that the rear steering angle has a common magnitude with the front steering angle. Similarly, the steering control system 76 may evaluate an amount of steering of the front steering system 32 and thereafter control the rear steering system 34 so that each of the third and fourth steering components 38c, 38d is moved in the same amount hut in opposite direction as a corresponding diagonally arranged one of the first and second steering components 38a, 38b of the front steering system 32. For instance, the steering control system 76 may first determine a front steering value for each of the first and second steering components 38a, 38b, and then determine a rear steering value for each of the third and fourth steering components 38c, 38d by determining an additive inverse of the diagonally arranged first and second steering component 38a, 38b. The steering components of the front and rear steering systems 32, 34 may be equal in magnitude and opposite in direction.

The steering control system 76 may be configured to command the first and fourth actuators 48a, 48d to move the first and fourth steering joints 62a, 62d to a position that defines corresponding steering angles of a common magnitude. Similarly, the steering control system 76 may command the second and third actuators 48b, 48c to move the second and third steering joints 62b, 62c to positions that define corresponding steering angles of a common magnitude and opposite directions. Additionally, the steering control system 76 may determine a command value for the diagonal pairs of the front and rear actuators 48 by first evaluating a command value for the respective front steering actuator 48a or 48b as a front steering command value. For instance, the steering control system 76 may evaluate a first front steering command value for the first actuator 48a, and a second front steering command value for the second actuator 48b. Thereafter, a rear steering command value may be calculated as the additive inverse of the front steering command value for a corresponding diagonally arranged rear steering actuator 48c, 48d. A third rear steering command value may be calculated for the third actuator 48c by taking an additive inverse of the second front steering command value, and a fourth rear steering command value may be calculated for the fourth actuator 48d by taking an additive inverse of the first front steering command value. Each of these steering command values may correspond to a distance moved by the respective steering actuator 48 from a neutral position.

The steering input device 78 and steering control system 76 work together to determine and control the various actuators to result in a desired steering maneuver. For instance, the steering maneuver may define a four-wheel turn-steering maneuver, as seem in FIGS. 8 and 9. To do so, the steering control system 76 initially receives a steering input from the user through the steering input device 78. This steering input may define a turn-steering command for providing a turning-type beading of the sprayer 10. Next, the steering control system 76 controls the first and second steering actuators 48a, 48b to provide the front steering direction and the front steering angle to result in the turn-steering command. Thereafter, but substantially simultaneously, the steering control system 76 controls the third and fourth steering actuators 48c, 48d to provide a rear steering direction. The rear steering direction is opposite from the front steering direction and the rear steering angle may have a common magnitude as the front steering angle. Thus, the pair of front steerable wheels 22a, 22b and the pair of rear steerable wheels 22c, 22d are pivoted the same amount but in opposite directions during the turn-steering maneuver. This simplifies the process of determining and controlling the actuators 48 to result in the desired steering maneuver.

Figure 10:
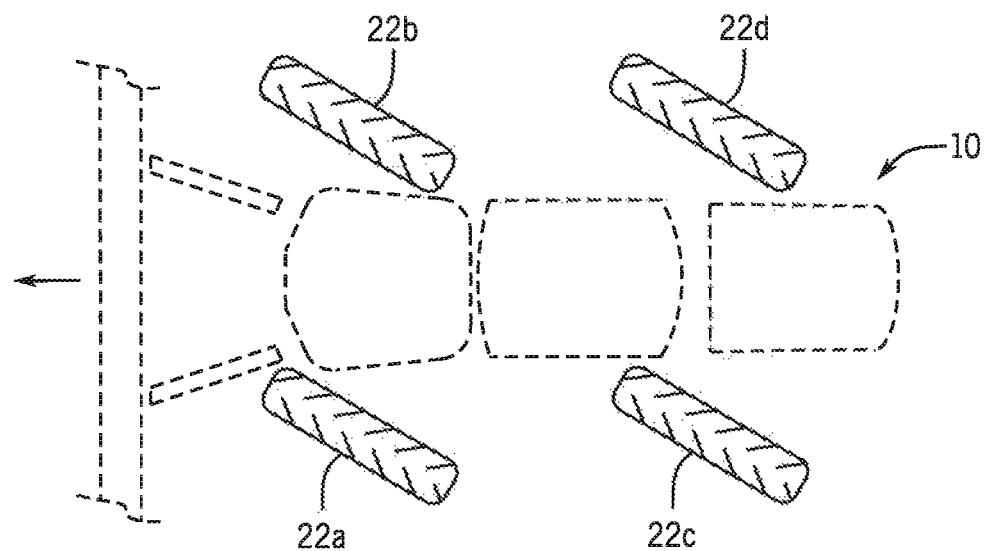
FIG. 10 is a schematic top plan view of the sprayer performing a first crab-steering maneuver.
Figure 11:
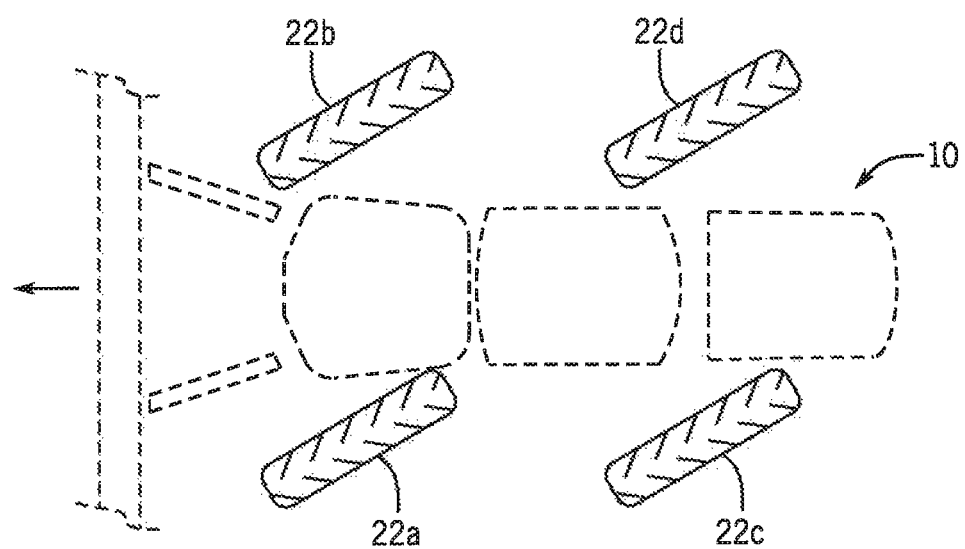
FIG. 11 is a schematic top plan view of the sprayer performing a second crab-steering maneuver.

Alternatively, the steering maneuver may define a crab-steering maneuver, as seen in FIGS. 10 and 11. In such an instance, the steering control system first receives a steering input from the user through the steering input device 78 that defines a crab-steering command. The crab-steering command may result in oblique-type heading of the sprayer 10 to accommodate tighter turns. Next, the steering control system controls the first and second steering actuators 48a, 48b to provide the front steering direction and the front steering angle to correspond to the crab-steering command. After that, the steering control system 76 controls the third and fourth steering actuators 48c, 48d to provide a rear steering direction that is the same as the front steering direction and the rear steering angle with the common magnitude as the front steering angle. Therefore, the pair of front steerable wheels 22a, 22b and the pair of rear steerable wheels 22c, 22d are pivoted the same amount and in the same direction during the crab-steering maneuver.

Figure 12:
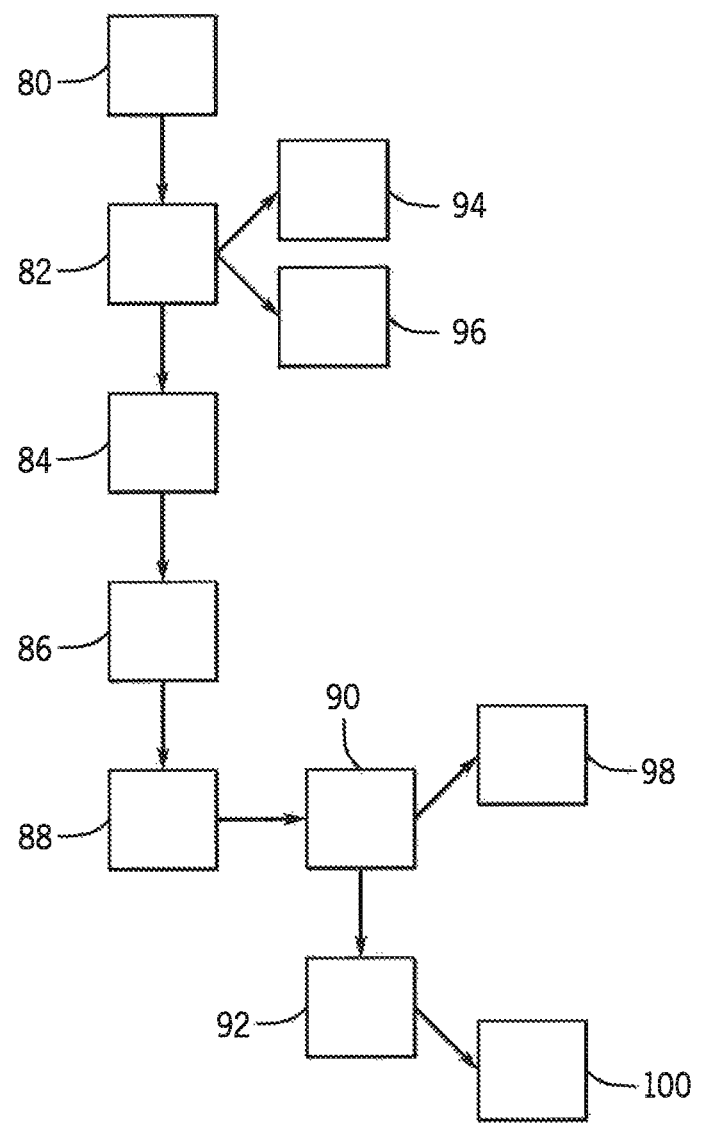
FIG. 12 is a block diagram showing a method of controlling the steering of the high-clearance sprayer.

A method of controlling the steering of the high clearance sprayer 10 will further be described and shown in schematics in FIG. 12. Initially, a steering command is input from a user through the steering input device that corresponds to a front steering action of the front steering system, as shown in block 80. Next, a front steering value is evaluated that corresponds to the steering action of the front steering system, as shown in block 82. Thereafter, a rear steering value is determined that has the same magnitude but opposite sign of the front steering value, as shown in block 84. The rear steering system is then controlled based on the rear steering value, as shown in block 86. Also, the steering of each rear wheel may be controlled based on the steering of the diagonally arranged opposite corner front wheel, as shown in block 88. Stated differently, the steering of the fourth wheel may be controlled based on the steering action of the first wheel, and the steering of the third wheel may be controlled based on the steering action of the second wheel. This can be achieved by first determining a first rear steering value for steering the first rear wheel by calculating an additive inverse of the steering value for steering the second front wheel, as seen in block 90. Next, the second rear steering value is determined by calculating an additive inverse of a steering value for steering the first front wheel, as seen in block 92.

Additionally, the method may include actuating the first steering actuator that extends between a first swingarm to a first wheel support based on the front steering value to move the first wheel support and the first steerable wheel to the front steering direction and the front steering angle, as seen in block 94. Similarly, the second steering actuator that extends between the second swingarm and the second wheel support can be actuated to move the second wheel support and the second steerable wheel to the front steering direction the front steering angle, as seen in block 96. Further still, the third steering actuator that extends between the third swingarm and the third wheel support can be actuated to move the third wheel support and the third steerable wheel to the rear steering direction the rear steering angle, as seen in block 98. Finally, the fourth steering actuator that extends between the fourth swingarm and the fourth wheel support can be actuated to move the fourth wheel support and the fourth steerable wheel to the rear steering direction the rear steering angle, as seen in block 100.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A high clearance sprayer with a four-wheel steering system, comprising:
   a steering input device configured to be manipulated by a user steering the high clearance sprayer to perform a steering maneuver;
   a front steering system, comprising:
      a pair of steerable front wheels that define:
         a first wheel configured to pivot about a first generally vertical steering axis;
         a second wheel configured to pivot about a second generally vertical steering axis;
      a front steering actuator system configured to pivot the pair of steerable front wheels in a common direction during the steering maneuver to define a front steering direction and a front steering angle during the steering maneuver;
   a rear steering system, comprising:
      a pair of steerable rear wheels that define:
         a third wheel configured to pivot about a third generally vertical steering axis;
         a fourth wheel configured to pivot about a fourth generally vertical steering axis;
      a rear steering actuator system configured to pivot the pair of steerable rear wheels in a common direction during the steering maneuver to define a rear steering direction and a rear steering angle during the steering maneuver; and
   a steering control system configured to command the rear steering system to steer the pair of steerable rear wheels so that the rear steering angle has a common magnitude with the front steering angle.

2. The high clearance sprayer of claim 1, further comprising:
   a chassis having a frame with front and rear portions;
   a pair of front swingarms arranged at the front portion of the chassis frame;
   a pair of front wheel support legs that support the pair of steerable front wheels and are pivotally connected to the pair of front swingarms to define the first and second generally vertical steering axes;
   wherein the front steering actuator system defines:
      a first steering actuator that extends between a first swingarm of the pair of front swingarms and a first wheel support of the pair of front wheel supports to move the first wheel support and the first steerable wheel to the front steering direction and the front steering angle;
      a second steering actuator that extends between a second swingarm of the pair of front swingarms and a second wheel support of the pair of front wheel supports to move the second wheel support and the second steerable wheel to the front steering direction and the front steering angle;
   a pair of rear swingarms arranged at the rear portion of the chassis frame;
   a pair of rear wheel support legs that support the pair of steerable rear wheels and are pivotally connected to the pair of rear swingarms to define the third and fourth generally vertical steering axes;
   wherein the rear steering actuator system defines:
      a third steering actuator that extends between a third swingarm of the pair of rear swingarms and a third wheel support of the pair of rear wheel supports to move the third wheel support and the third steerable wheel to the rear steering direction and the rear steering angle; and
      a fourth steering actuator that extends between a fourth swingarm of the pair of rear swingarms and a fourth wheel support of the pair of rear wheel supports to move the second wheel support and the second steerable wheel to the front steering direction and front steering angle.

3. The high clearance sprayer of claim 2, wherein the steering maneuver defines a turn-steering maneuver and the steering control system:
   receives a steering input from the user through e steering input device that defines a turn-steering command for providing a turning-type heading of the high clearance sprayer;
   controls the first and second steering actuators to provide the front steering direction and the front steering angle to correspond to the turn-steering command; and
   controls the third and fourth steering actuators to provide a rear steering direction that is opposite the front steering direction and the rear steering angle with the common magnitude as the front steering angle so that the pair of front steerable wheels and the pair of rear steerable wheels are pivoted the same amount but in opposite directions during the turn-steering maneuver.

4. The high clearance sprayer of claim 2, wherein during the steering maneuver defines a crab-steering maneuver and the steering control system:
   receives a steering input from the user through the steering input device that defines a crab-steering command for providing an oblique-type heading of the high clearance sprayer;
   controls the first and second steering actuators to provide the front steering direction and the front steering angle to correspond to the crab-steering command; and
   controls the third and fourth steering actuators to provide a rear steering direction that is the same as the front steering direction and the rear steering angle with the common magnitude as the front steering angle so that the pair of front steerable wheels and the pair of rear steerable wheels are pivoted the same amount and in the same direction during the crab-steering maneuver.

5. The high clearance sprayer of claim 2, wherein a steering joint is defined at each intersection of the swingarms and the corresponding wheel support legs and wherein the steering joint includes:
   a steering knuckle arranged at an upper end of the respective wheel support leg;
   a steering kingpin that defines the respective steering axis and extends through the steering knuckle and an end of the respective swingarm; and
   an actuator lobe that is connected to an end of the respective steering actuator and is arranged with respect to the steering knuckle so that actuation of the steering actuator pivots the steering knuckle and wheel support leg about the steering kingpin.

6. The high clearance sprayer of claim 2, wherein each of the first, second, third, and fourth steering actuators has a first end connected to the respective swingarm and a second end connected to the respective wheel support leg so that actuation of each of the first, second, third, and fourth steering actuators pivots the respective wheel support leg with respect to the respective swingarm.

7. The high clearance sprayer of claim 1, further comprising a chassis having a frame with front and rear portions, and wherein:
   the front steering system includes a pair of front steering joints arranged toward the front portion of the chassis frame and that define first and second steering joints that are coupled to first and second steering actuators that are configured to move the first and second steering joints relative to the chassis frame to pivot the first and second wheel about the first and second steering axes;

the rear steering system includes a pair of rear steering joints arranged toward the rear portion of the chassis frame and that define third and fourth steering joints that are coupled to third and fourth steering actuators that are configured to move the third and fourth steering joints relative to the chassis frame to pivot the third and fourth wheel about the third and fourth steering axes;

within the pair of front steering joints, the first and second steering joints are mirror images of each other about a line of reflection that extends longitudinally through the high clearance sprayer;

within the pair of rear steering joints, the third and fourth steering joints are mirror images of each other about a line of reflection that extends longitudinally through the high clearance sprayer; and between the pair of front steering joints and the pair of rear steering joints, the pair of rear steering joints is a mirror image of the pair of front steering joints about a line of reflection that extends transversely through the high clearance sprayer.

8. The high clearance sprayer of claim 7, wherein:

the first steering joint of the pair of front steering joints and the third steering joint of the pair of rear steering joints are longitudinally aligned with each other;

the second steering joint of the pair of front steering joints and the fourth steering joint of the pair of rear steering joints are longitudinally aligned with each other; and wherein the steering control system commands a four wheel steering maneuver by controlling diagonal pairs of the front and rear steering actuators at the respective pairs of steering joints, wherein the steering control system commands the first and fourth steering actuators to move the first and fourth steering joints to positions that define corresponding steering angles of a common magnitude and opposite directions; and the steering control system commands the second and third steering actuators to move the second and third steering joints to positions that define corresponding steering angles of a common magnitude and opposite directions.

9. The high clearance sprayer of claim 8, wherein:

the steering control system determines a command value for the diagonal pairs of the front and rear steering actuators by:

evaluating a command value for the respective front steering actuator as a front steering command value; and determining an additive inverse of the front steering command value as a rear steering command value for a corresponding diagonally arranged rear steering actuator.

10. The high clearance sprayer of claim 9, wherein the steering control system:

evaluates the front steering command value for the first steering actuator as a first front steering command value;

determines an additive inverse of the first front steering command value to define a rear steering command value for the fourth rear steering actuator;

evaluates the front steering command value for the second steering actuator as a second front steering command value; and determines an additive inverse of the second front steering command value to define a rear steering command value for the third rear steering actuator.

11. The high clearance sprayer of claim 10, wherein each of the steering command values corresponds to a distance moved by the respective steering actuator from a neutral position.

12. A high clearance sprayer comprising;

a steering input device configured to be manipulated by a user to provide steering commands for steering the high clearance sprayer;

a first wheel, a second wheel, a third wheel, and a fourth wheel;

a front steering system with:
 a first steering component configured to control steering movements of the first wheel;
 a second steering component configured to control steering movements of the second wheel;

a rear steering system with:
 a third steering component configured to control steering movements of the third wheel;
 a fourth steering component configured to control steering movements of the fourth wheel;

a steering control system that evaluates an amount of steering of the front steering system and controls the rear steering system so that each of the third and fourth steering components is moved in the same amount but opposite direction as a corresponding diagonally arranged one of the first and second steering components of the front steering system.

13. The high clearance sprayer of claim 12, wherein for each of the first and second steering components of the front steering system, the controller system evaluates a corresponding front steering value and determines a rear steering value for a corresponding diagonally arranged one of the third and fourth steering components of the rear steering system by determining an additive inverse of the front steering value.

14. The high clearance sprayer of claim 13, wherein corresponding pairs of the steering components of the front and rear steering systems are steered to steering values that are equal in magnitude and opposite in direction.

15. The high clearance sprayer of claim 12, further comprising:

a frame;

a first swingarm that defines a first suspension component supported by the frame;

a second swingarm that defines a second suspension component supported by the frame;

a third swingarm that defines a third suspension component supported by the frame;

a fourth swingarm that defines a fourth suspension component supported by the frame;

a first actuating cylinder with an inner end connected to the first swingarm and an outer end connected to the first steering component for moving the first steering component to steer the first wheel;

a second actuating cylinder with an inner end connected to the second swingarm and an outer end connected to the second steering component for moving the second steering component to steer the second wheel;

wherein the first and second actuating cylinders are arranged angularly with respect to each other, with the outer ends of the first and second actuating cylinders arranged closer to a center line of the high clearance sprayer then the inner ends of the first and second actuating cylinders;

a third actuating cylinder with an inner end connected to the third swingarm and outer end connected to the third steering component for moving the third steering component to steer the third wheel;

a fourth actuating cylinder with an inner end connected to the fourth swingarm and outer end connected to the fourth steering component for moving the fourth steering component to steer the fourth wheel; and wherein the third and fourth actuating cylinders are arranged angularly with respect to each other, with the outer ends of the third and fourth actuating cylinders arranged closer to a center line of the high clearance sprayer then the inner ends of the third and fourth actuating cylinders.

16. The high clearance sprayer of claim 12, further defining a longitudinal axis located along a centerline between left and right sides of high clearance sprayer;

wherein the first and second steering components are mirror images of each other as reflected about the longitudinal axis; and wherein the third and fourth steering components are mirror images of each other as reflected about the longitudinal axis.

17. The high clearance sprayer of claim 16, further defining a transverse axis located midway between the steering components of the front steering system and the steering components of the rear steering system;

wherein the first and third steering components are mirror images of each other as reflected about the transverse axis; and wherein the second and fourth steering components are minor is ages of each other as reflected about the transverse axis.

18. A method of controlling the steering of a high clearance sprayer have a front steering system that provides steering movements to a first front wheel and a second front wheel and a rear steering system that provides steering movements to a first rear wheel and a second rear wheel comprising the steps of:

inputting a steering command from a user through a steering input device that corresponds to a front steering action of the front steering system;

evaluating a front steering value that corresponds to the steering action of the front steering system;

determining a rear steering value that has the same magnitude but opposite sign of the front steering value; and controlling the rear steering system to provide a rear steering action based on the rear steering value.

19. The method of controlling the steering of a high clearance sprayer of claim 18, further comprising:

controlling steering of each of the rear wheels based on the steering action of the diagonally arranged opposite corner front wheel;

wherein determining the rear steering value includes:

determining a first rear steering value for steering the first rear wheel by determining an additive inverse of a steering value for steering the second front wheel; and determining a second rear steering value for steering the second rear wheel by determining an additive inverse of a steering value for steering the first front wheel.

20. The method of controlling the steering of a high clearance sprayer of claim 18, further comprising:

actuating a first steering actuator that extends between a first swingarm to a first wheel support based on the front steering value to move the first wheel support and the first steerable wheel to the front steering direction and the front steering angle;

actuating a second steering actuator that extends between a second swingarm to a second wheel support based on the front steering value to move the second wheel support and the second steerable wheel to the front steering direction and the front steering angle;

actuating a third steering actuator that extends between a third swingarm to a third wheel support based on the rear steering value to move the third wheel support and the third steerable wheel to the rear steering direction and the rear steering angle; and actuating a fourth steering actuator that extends between a fourth swingarm to a fourth wheel support based on the ear steering value to move the fourth wheel support and the fourth steerable wheel to the rear steering direction and the rear steering angle.

* * * * *